United States Patent [19]

Hirobe et al.

[11] Patent Number: 4,719,511
[45] Date of Patent: Jan. 12, 1988

[54] EXPOSURE CONTROLLING METHOD FOR TELEVISION CAMERA

[75] Inventors: Hitoshi Hirobe; Hideo Morita; Takeharu Shin, all of Tokyo, Japan

[73] Assignee: Asahi Kogaku Kogyo Kabushiki Kaisha, Tokyo, Japan

[21] Appl. No.: 878,516

[22] Filed: Jun. 23, 1986

Related U.S. Application Data

[63] Continuation of Ser. No. 596,749, Apr. 4, 1984, abandoned.

[51] Int. Cl.⁴ .............................................. H04N 3/14
[52] U.S. Cl. ................................. 358/213.19; 358/228
[58] Field of Search ............... 358/227, 213.19, 228; 354/432, 429, 486, 451, 452, 453, 403, 408

[56] References Cited

U.S. PATENT DOCUMENTS

| | | | |
|---|---|---|---|
| 3,617,633 | 11/1971 | Oadby | 358/227 |
| 3,621,136 | 11/1971 | Stanwood | 358/227 |
| 3,699,248 | 10/1972 | McKechnie | 358/227 |
| 3,699,251 | 10/1972 | McKechnie | 358/227 |
| 3,967,056 | 6/1976 | Yata et al. | 358/227 |
| 4,324,464 | 4/1982 | Wick | 354/25 |
| 4,354,204 | 10/1982 | Kimura | 358/227 |
| 4,404,595 | 9/1983 | Ushiro et al. | 358/227 |
| 4,414,575 | 11/1983 | Yamamoto et al. | 358/227 |
| 4,423,936 | 1/1984 | Johnson | 354/403 |
| 4,460,257 | 7/1984 | Ogasawara | 354/402 |
| 4,466,718 | 8/1984 | Lermann et al. | 354/408 |
| 4,506,300 | 3/1985 | Fearnside | 358/225 |

Primary Examiner—Robert Lev
Attorney, Agent, or Firm—Sughrue, Mion, Zinn, Macpeak & Seas

[57] ABSTRACT

A method for controlling the amount of the exposure of a television camera whereby a luminance signal from only a selected portion of an overall photometric range of the camera is employed for adjusting the exposure. A first signal is produced specifying the selected photometric range. In response to this signal, and further in response to horizontal and vertical synchronizing signals from the television camera in synchronization with the scanning of an electron beam in the camera, a range signal is produced when the scanning beam is within the specified photometric range. The luminance signal outputted by the television camera only at that time is employed for exposure control.

3 Claims, 3 Drawing Figures

EXPOSURE CONTROLLING METHOD FOR TELEVISION CAMERA

This is a continuation of application Ser. No. 596,749 filed Apr. 4, 1984, now abandoned.

BACKGROUND OF THE INVENTION

The present invention relates to an exposure controlling method for a television camera.

In a conventional television camera, the average value of the luminance of the entirety of the video output signal representing the entire photographed image, or the peak value thereof, is utilized for exposure control. However, such an exposure value is not always satisfactory because exposure conditions of objects other than the main object affect the value.

It is a primary object of the invention to provide an exposure control method for a television camera which overcomes such a drawback.

SUMMARY OF THE INVENTION

In accordance with the method of the invention, the video output signal from a selected particular region of the image pickup range of the television camera is used to meter the luminance of the region thus selected, and thereby to set an exposure value which is most suitable for the object. More particularly, in accordance with an exposure adjusting method of the invention for a television camera, the positon and size of a selected photometric range in the iamge pickup range are specified as digital values and supplied to a microcomputer, which also receives a horizontal synchronizing signal and a vertical synchronizing signal. The microcomputer determines from these input signals whether or not the scanning beam is presently inside the specified photometric range. When and only when the beam is inside the photometric range, the luminance signal then being produced is applied to an exposure control circuit, whereby exposure control is performed using luminance information taken from within only a selected photometric range.

DESCRIPTION OF THE PREFERRED EMBODIMENTS

A preferred embodiment of the method of the invention will be described with reference to the accompanying drawings.

Figure 1:
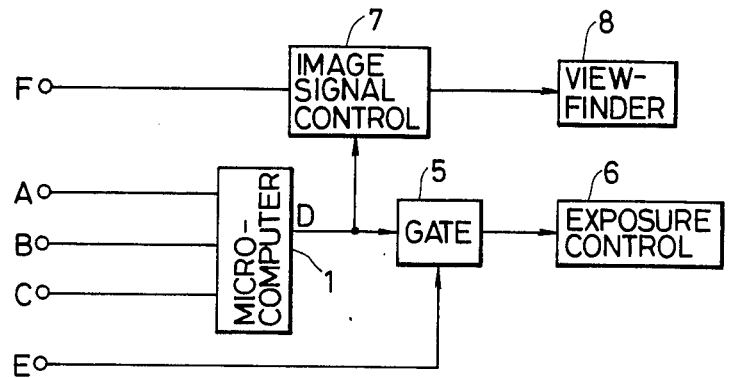
FIG. 1 is a block diagram of a control circuit which operates in accordance with the method of the invention.
Figure 2:
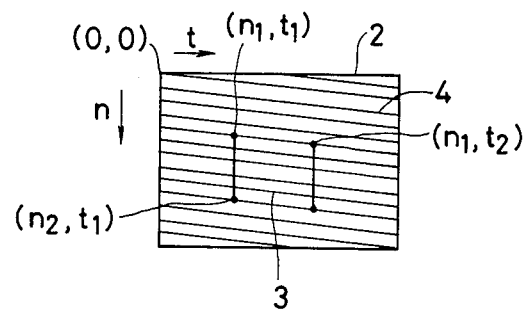
FIG. 2 is an explanatory diagram used for a description of the exposure photometry of an image pickup frame.

FIG. 1 is a block diagram of a control circuit constructed in accordance with the invention. As shown in FIG. 1, a microcomputer 1 receives a horizontal synchronizing signal A, a vertical synchronizing signal B, and a photometric range specifying signal C, the latter being supplied from a television camera device (not shown). The photometric range specifying signal C is used to designate a particular photometric range, for example, a range 3 indicated in FIG. 2, out of an image pickup range corresponding to an image pickup frame 2. The rectangular photometric range 3 is defined by coordinates $(n_1, t_1)$, $(N_2, t_1)$ and $(n_1, t_2)$ which are determined by scanning line numbers (n) obtained by counting scanning lines 4 downwardly starting with the point 0 at the upper left corner of the frame 2, and horizontal scanning times (t) measured along scanning lines 4. More specifically, a desired section of the frame 2 can be designated by operating selecting switches. For instance, with respect to the position of the photometric range 3, the central part of the frame may be specified by operating a corresponding selecting switch. The upper right part, the upper left part, etc., may also be selectable by operating respective selecting switches.

The microcomputer 1, using the horizontal synchronizing signal A and the vertical synchronizing signal B, determines whether or not the scanning beam is within a specified photometric range 3 at predetermined time intervals in synchronization with the scanning of the beam along the scanning lines 4. When the beam is within the photometric range 3, the microcomputer 1 outputs a photometry range signal D which is applied to a gate circuit 5. Upon reception of the signal D, the gate circuit 5 transmits a luminance signal E from the television camera to an exposure control circuit 6. In response to the luminance signal E, the exposure control circuit 6 carries out exposure photometry in the usual manner. The luminance signal utilized for exposure photometry is that which is present only for the period of time that the beam is scanning the designated photometric range 3, and exposure adjustment is performed only with the luminance signal corresponding to the designated photometric range 3.

The image signal F produced by the television camera is applied to an image signal control circuit 7. The circuit 7 attenuates the image signal by a predetermined factor for the period of time that the range signal D is outputted and applies the image signal to an electronic viewfinder 8 directly (without attenuation) for the period of time that the range signal D is not outputted. Accordingly, in the image corresponding to the frame 2 in FIG. 2, the part corresponding to the photometric range 3 is slightly darker than the other parts. Thus, it can be visually confirmed that exposure adjustment has been made for the selected range.

Figure 3:
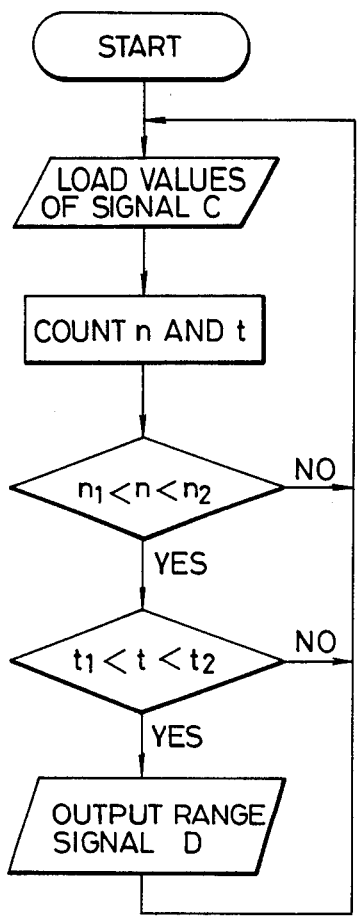
FIG. 3 is a flowchart used for a description of the exposure adjustment control method of the invention.

Exposure adjustment with the circuit shown in FIG. 1 will be described with reference to the flowchart of FIG. 3. Upon the start of the operation, specified scanning line numbers $n_1$ and $n_2$ and horizontal scanning times $t_1$ and $t_2$ indicated by the photometric range specifying signal C are inputted. Next, the scanning line number n and the horizontal scanning time t are counted in response to the horizontal synchronizing signal A and the vertical synchronizing signal B. When the expression $n_1 < n < n_2$ is not satisfied, the counting operation is repeatedly carried out until the expression is satisfied. Similarly, when the expression $t_1 < t < t_2$ is not satisfied, the counting operation is repeatedly carried out until the expression is satisfied. The horizontal scanning time counting speed is much higher than the scanning line number counting speed. Therefore, with n fixed, the counting of t is advanced. When the expression $t_1 < t < t_2$ is satisfied, the photometry specifying range signal D is outputted. In response thereto, the gate circuit 5 is opened and the luminance signal E is applied to the exposure control circuit 6. The program is repeatedly run in the above-described manner. When the scanning line number n and the horizontal scanning time reach the lowermost scanning line and the lower right corner, respectively, the count values are reset and the operation is repeated. Thus, only when both of the expressions $n_1<n<n_2$ and $t_1<t<t_2$ are satisfied is the range signal D outputted. Accordingly, only when the photometric range 3 is being scanned is the luminance signal used for exposure adjustment control.

As is apparent from the above description, according to the invention, a particular area is selected out of the image pickup range of the television camera, and exposure adjustment is carried out with the luminance of the area thus selected. Thus, in accordance with the exposure adjusting method of the invention, an exposure value for a main object can be readily set with a high accuracy, and the photographic effect is considerably improved.

We claim:

1. A method of exposure control for a television camera, comprising the steps of:

providing a first signal for specifying a portion of an overall image pickup range of said television camera to be utilized for exposure photometry;

providing a range specifying signal when a scanning beam of said television camera is within said portion of the overall image pickup range specified by said first signal; said range specifying signal being produced by (a) counting pulses of a horizontal synchronizing signal produced by said television camera;

(b) counting pulses of a vertical synchronizing signal produced by said television camera; and (c) comparing said first signal with current values produced by said steps of counting said pulses of said horizontal and vertical synchronizing signals; said counting and comparing operations being effected through the use of a microcomputer; and setting an exposure of said camera in response to a luminance signal output of said television camera when said range specifying signal is present.

2. The method of claim 1, wherein said luminance signal output of said television camera is applied as an input to a gate circuit, said gate circuit being selectively enabled by said range specifying signal to permit said luminance signal to be applied to exposure control circuitry of said television camera.

3. The exposure controlling method of claim 1, further comprising the step of varying a brightness of an area in an electronic viewfinder of the television camera when said range specifying signal is present.

* * * * *